United States Patent [19]

Baba

[11] 3,960,683

[45] June 1, 1976

[54] PROCESS FOR THE DESULFURIZATION OF LIGHT OILS

[75] Inventor: Yoshio Baba, Kawaguchi, Japan

[73] Assignee: Director-General of the Agency of Industrial Science and Technology, Tokyo, Japan

[22] Filed: July 23, 1974

[21] Appl. No.: 491,103

[30] Foreign Application Priority Data

July 24, 1973    Japan................................. 48-83318

[52] U.S. Cl. ......................... 204/158 R; 204/162 R
[51] Int. Cl.$^2$............................................ B01J 1/10
[58] Field of Search ...... 204/158 R, 162 R, 157.1 R

[56] References Cited

UNITED STATES PATENTS

| | | | |
|---|---|---|---|
| 1,904,382 | 4/1933 | Morrell | 204/158 R |
| 3,616,375 | 10/1971 | Inoue | 204/162 R |

*Primary Examiner*—Howard S. Williams
*Attorney, Agent, or Firm*—William J. Daniel

[57] ABSTRACT

A process for the desulfurization of light oils, which comprises irradiating light oils containing sulfur compounds such as mercaptans and sulfides with ultraviolet rays to decompose the sulfur compounds into water-soluble compounds and thereafter, washing the light oils with water to remove the water-soluble compounds.

4 Claims, No Drawings

PROCESS FOR THE DESULFURIZATION OF LIGHT OILS

BACKGROUND OF THE INVENTION

The present invention relates to a process for the desulfurization of light oils. More particularly, this invention relates to a process wherein light oils are irradiated with ultraviolet rays to decompose mercaptans and sulfides contained in the light oils into water-soluble compounds such as $SO_2$, $SO_3$ and sulfonic acids and thereafter, the irradiated light oils are washed with water to remove such water-soluble compounds.

At present, the hydrogenating desulfurization method or the sweetening method is widely adopted for refining light oils such as naphtha and staight-run gasoline. However, the hydrogenating desulfurization method is not only expensive due to the necessity for special equipment, but is also subject to operating difficulties as the method often permits occurrence of fouling and clogging of pipes with scale. On the other hand, the sweetening method, which is not suitable for complete removal of tertiary mercaptans and sulfides, is inferior in the overall desulfurization rate and has an additional disadvantage that the treated effluent from a plant using this method emits very unpleasant odors. These two methods now in practice therefor still involve some problems to be solved. Thus, there is a real demand in the field of petrochemistry for the development of a new method desulfurizing light oils completely by a simple operation without the necessity of special equipment.

BRIEF SUMMARY OF THE INVENTION

An object of the present invention is to provide an improved process for the desulfurization of light oils.

Another object of the present invention is to provide a process for the removal of sulfur compounds which are contained in light oils and which hinder the beneficial effect achieved by addition of lead to the light oils.

A further object of the present invention is to provide a process for converting lower mercaptans and lower sulfides contained in light oils into compounds which can easily be washed away with water.

Other and further objects, features and advantages of the present invention will appear more fully from the following description.

DETAILED DESCRIPTION OF THE INVENTION

In accordance with this invention, the aforesaid objects can easily be attained by irradiating light oils containing sulfur compounds, such as lower mercaptans and lower sulfides, with ultraviolet rays to decompose these sulfur compounds into water-soluble compounds and thereafter, washing the light oils with water to remove the watersoluble compounds. The efficiency for removing the sulfur compounds in this way can be enhanced by irradiating the light oils with ultraviolet rays while blowing oxygen or an oxygen-containing gas such as air into the light oils.

Examples of the light oils to be treated according to the process of the present invention include straight-run gasoline, light naphtha, kerosene, diesel light oil and the like. Sulfur compounds contained in such light oils are mercaptans such as methyl mercaptan, ethyl mercaptan, isopropyl mercaptan, isobutyl mercaptan and secondary butyl mercaptan; sulfides such as dimethyl sulfide, diethyl sulfide, methyl and ethyl sulfide; and other sulfur compounds such as hydrogen sulfide. These sulfur compounds hinder the beneficial effect achieved by addition of lead (in the form of a lead compound such as tetraalkyl lead) to the light oils. According to the process of the present invention, however, the sulfur compounds hindering the beneficial effect achieved by addition of lead can almost completely be removed.

In a preferred embodiment of the present invention, light oils are irradiated for 5–60 minutes with ultraviolet rays from a high voltage mercury lamp (the main wave length: 3650 A) or a low voltage mercury lamp (the main wave length: 2537 A). By this irradiation treatment, the lower mercaptans and the lower sulfides are photo-decomposed and coverted into water-soluble substances which can easily be washed away with water. The light oils thus treated are then washed with water until all trace of residual sulfur can no longer be detected in the washings, whereby the lower mercaptans, lower sulfides and water-soluble sulfur compounds can almost completely be removed from the light oils.

According to another preferred embodiment of this invention, the light oils containing sulfur compounds are irradiated for 5–40 minutes with ultraviolet rays while blowing oxygen or an oxygen-containing gas, such as air, into the light oils at a rate of 5–15 ml/minute. By this combination treatment, the mercaptans and sulfides are photo-decomposed and the initially formed free radicals are, prior to their re-bonding, oxidized to form oxygen-containing watersoluble sulfur compounds such as $SO_2$, $SO_3$ and sulfonic acids which can easily be removed from the light oils by washing them with water.

In the process of the present invention, the above treatment is carried out at a temperature within the range of 0° – 60°C. A higher temperature may also be adopted, but without any additional merit.

When light oils are treated according to the process of the present invention, 80 – 90 percent of all the mercaptans and sulfides contained in the starting light oils are decomposed so that the total quantity of the sulfur compounds is decreased to about 30 percent or less of the original quantity. Moreover, any sulfur compound remaining in the treated light oils is a higher sulfide which no longer hinders the beneficial effect achieved by addition of lead to light oils. Accordingly, the treatment according to this invention gives no adverse effect on the use of the treated light oils.

The following examples are included merely to aid in the understanding of the present invention and variations may be made by one skilled in the art without departing from the spirit and scope of the present invention.

EXAMPLE 1

A 220 ml Pyrex reaction flask, equipped with a lamp housing having a water-cooled mantle, a reflux condenser cooled by recycling ice water and a thermometer, was charged with 100 ml of straight-run naphtha (boiling point: 27°–95°C; total sulfur content: 0.15 percent) obtained by refining Iranian heavy crude oil. The naphtha was kept at a constant temperature and irradiated with the light (the main wave length: 3650 A) from a 200 W high voltage mercury lamp.

One milliliter of the contents of the flask was removed at definite intervals and admixed with 100 $\mu$-liters of a standard solution (prepared by dissolving 10 $\mu$ liters of n-propyl sulfide in 5 ml of n-hexane and storing in a dark cool place). The sample thus prepared was analyzed by way of gas chromatography (with FPD) to determine a ratio of the peak areas of the seven main kinds of mercaptans and sulfides contained in the sample oil to the peak area of the standard solution. In each sample, the relative peak areas for seven kinds of sulfur compounds were compared with those of the starting oil to determine a photo-decomposition rate (%) for the individual sulfur compounds.

The results obtained using reaction temperatures of 0°C, 30°C and 50°C are shown in Table 1.

The light oils thus treated were then washed with water whereby the overall sulfur content could be decreased significantly. For example, when the light oils were irradiated at 50°C for 40 minutes with ultraviolet rays and then washed with water until existence of sulfur was no longer detected in the washings, the overall sulfur content was decreased only to 0.04 percent. In addition, the remaining sulfur compounds in the treated light oils were found to be higher sulfides which scarcely hinder the beneficial effect achieved by addition of lead.

that described in Example 1 except that the light oils were cooled to 0°C and oxygen or air was blown thereinto at a rate of 5 ml/minute, 15 ml/minute and 30 ml/minute. The product was then analyzed in the same manner as described in Example 1.

In this experiment, there is a possibility of "mechanical loss" of sulfur compounds due to blowing of air or oxygen or occurrence of some side chemical reaction. Thus, a "dark" reaction (the reaction without irradiation of ultraviolet rays, i.e. a reaction shielded from the light) under the same experimental conditions was also carried out for each experiment and the photo-decomposition value for the dark reaction was subtracted from the photo-decomposition rate for the reaction under irradiation of ultraviolet rays to give a "true" or corrected photo-decomposition rate for each experiment. The results are shown in Table 2.

The light oils thus treated were then washed with water until no trace of sulfur could be detected in the washings. In all the experiments wherein the light oils were irradiated for 40 minutes with ultraviolet rays, the final overall sulfur content was .03.

Table 1

| | Irradiation Temperature | | | | | | | | | | | | | | |
|---|---|---|---|---|---|---|---|---|---|---|---|---|---|---|---|
| | 0°C | | | | | 30°C | | | | | 50°C | | | | |
| Irradiation Time (min.) | 5 | 10 | 20 | 30 | 40 | 5 | 10 | 20 | 30 | 40 | 5 | 10 | 20 | 30 | 40 |
| Sulfur compound | | | | | | | | | | | | | | | |
| Ethyl mercaptan | 0 | 3 | 32 | 55 | 76 | 0 | 7 | 27 | 53 | 67 | 0 | 0 | 38 | 57 | 71 |
| Isopropyl mercaptan | 10 | 20 | 43 | 58 | 75 | 18 | 27 | 43 | 60 | 70 | 31 | 35 | 59 | 69 | 77 |
| Dimethyl sulfide | 3 | 12 | 33 | 42 | 58 | 8 | 8 | 19 | 36 | 44 | 10 | 14 | 26 | 34 | 43 |
| Methyl ethyl sulfide | 15 | 33 | 68 | 83 | 91 | 19 | 39 | 61 | 78 | 87 | 41 | 56 | 72 | 82 | 90 |
| sec-Butyl mercaptan | 17 | 30 | 51 | 65 | 73 | 23 | 38 | 47 | 61 | 69 | 33 | 41 | 51 | 59 | 68 |
| Isobutyl mercaptan | 11 | 31 | 53 | 80 | 82 | 37 | 44 | 60 | 69 | 85 | 31 | 48 | 45 | 52 | 71 |
| Diethyl sulfide | 8 | 33 | 52 | 62 | 69 | 24 | 29 | 50 | 52 | 55 | 14 | 30 | 27 | 53 | 36 |

Note: The analytical values are shown in terms of percentage.

Table 2

| Aeration rate | 5 ml Air/min. | | | | | 15 ml Air/min | | | | | 5 ml $O_2$/min. | | | | |
|---|---|---|---|---|---|---|---|---|---|---|---|---|---|---|---|
| Irradiation time (min.) | 5 | 10 | 20 | 30 | 40 | 5 | 10 | 20 | 30 | 40 | 5 | 10 | 20 | 30 | 40 |
| Sulfur compound | | | | | | | | | | | | | | | |
| Ethyl mercaptan | 23 | 47 | 80 | 92 | 98 | 25 | 55 | 90 | 99 | 100 | 24 | 59 | 95 | 100 | 100 |
| Isopropyl mercaptan | 40 | 57 | 81 | 91 | 96 | 33 | 53 | 83 | 97 | 100 | 37 | 57 | 88 | 99 | 100 |
| Dimethyl sulfide | 31 | 43 | 66 | 77 | 87 | 27 | 50 | 81 | 96 | 100 | 34 | 56 | 90 | 100 | 100 |
| Methyl ethyl sulfide | 51 | 69 | 90 | 97 | 100 | 54 | 73 | 100 | 100 | 100 | 48 | 81 | 100 | 100 | 100 |
| sec-Butyl mercaptan | 42 | 55 | 76 | 86 | 93 | 47 | 62 | 88 | 97 | 100 | 37 | 66 | 89 | 99 | 100 |
| Isobutyl mercaptan | 38 | 56 | 74 | 87 | 92 | 54 | 69 | 100 | 100 | 100 | 44 | 100 | 100 | 100 | 100 |
| Diethyl sulfide | 37 | 52 | 68 | 77 | 82 | 43 | 64 | 87 | 100 | 100 | 43 | 74 | 95 | 100 | 100 |

Table 2 — Continued

| Aeration rate | 15 ml $O_2$/min. | | | | | 30 ml $O_2$/min. | | | | |
|---|---|---|---|---|---|---|---|---|---|---|
| Irradiation time (min.) | 5 | 10 | 20 | 30 | 40 | 5 | 10 | 20 | 30 | 40 |
| Sulfur compound | | | | | | | | | | |
| Ethyl mercaptan | 22 | 60 | 94 | 99 | 100 | 9 | 35 | 81 | 97 | 100 |
| Isopropyl mercaptan | 26 | 51 | 84 | 93 | 99 | 17 | 34 | 66 | 88 | 98 |
| Dimethyl sulfide | 33 | 62 | 94 | 100 | 100 | 18 | 43 | 81 | 98 | 100 |
| Methyl ethyl sulfide | 52 | 72 | 96 | 100 | 100 | 22 | 51 | 88 | 100 | 100 |
| sec-Butyl mercaptan | 41 | 59 | 89 | 98 | 99 | 20 | 44 | 75 | 90 | 98 |
| Isobutyl mercaptan | 46 | 64 | 100 | 100 | 100 | 16 | 45 | 65 | 100 | 100 |
| Diethyl sulfide | 51 | 74 | 95 | 100 | 100 | 20 | 52 | 84 | 100 | 100 |

EXAMPLE 2

Using the starting light oils and the irradiation apparatus identical with those used in Example 1, an irradiation experiment was carried out in a manner similar to

What is claimed is:

1. A process for desulfurizing light oils, characterized by irradiating a light oil containing sulfur compounds such as mercaptans and sulfides with ultraviolet rays in the presence of oxygen to decompose said sulfur compounds into water-soluble compounds and thereafter, washing said light oil with water to remove said water-soluble compounds.

2. A process according to claim 1 wherein reaction is carried out while blowing an oxygen-containing gas into said light oils.

3. A process according to claim 2 wherein said oxygen-containing gas is blown into said light oil at a rate of about 5 – 15 ml/min.

4. A process according to claim 1 wherein said reaction is carried out at a temperature ranging from 0°C to 60°C.

* * * * *